United States Patent
Esteves et al.

(10) Patent No.: US 6,560,211 B2
(45) Date of Patent: *May 6, 2003

(54) METHOD AND APPARATUS FOR VARIABLE AND FIXED FORWARD LINK RATE CONTROL IN A MOBILE RADIO COMMUNICATION SYSTEM

(75) Inventors: Eduardo A. S. Esteves, Del Mar, CA (US); Rajesh K. Pankaj, San Diego, CA (US); Peter J. Black, La Jolla, CA (US); Matthew S. Grob, La Jolla, CA (US); Nagabhushana T. Sindhushayana, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 09/748,319

(22) Filed: Dec. 22, 2000

(65) Prior Publication Data

US 2001/0000750 A1 May 3, 2001

Related U.S. Application Data

(63) Continuation of application No. 09/231,743, filed on Jan. 15, 1999, now Pat. No. 6,205,129.

(51) Int. Cl.[7] ............................. H04Q 7/00; H04Q 7/20; H04J 3/16; H04J 3/22
(52) U.S. Cl. ........................ 370/331; 370/468; 455/437; 455/451
(58) Field of Search ................................ 370/320–322, 370/326, 328–337, 342–348, 465, 468; 455/436–439, 450, 451, 452, 453

(56) References Cited

U.S. PATENT DOCUMENTS

| | | | | |
|---|---|---|---|---|
| 5,101,501 A | | 3/1992 | Gilhousen et al. ........... 455/422 |
| 5,327,576 A | * | 7/1994 | Uddenfeldt et al. ......... 370/333 |
| 5,442,625 A | * | 8/1995 | Gitlin et al. ................. 370/342 |
| 6,018,662 A | * | 1/2000 | Periyalwar et al. .......... 370/331 |
| 6,205,129 B1 | * | 3/2001 | Esteves et al. ............... 370/331 |
| 2002/0012334 A1 | * | 1/2002 | Strawczynski et al. ...... 370/337 |
| 2002/0034170 A1 | * | 3/2002 | Tiedemann et al. ......... 370/335 |

FOREIGN PATENT DOCUMENTS

| EP | 0472511 | 2/1992 |
|---|---|---|
| WO | 9610320 | 4/1996 |

OTHER PUBLICATIONS

"Multi-Rate DS-CDMA Radio Interface for Third-Generation Cellular Systems," A. Baier and H. Panzer, Mobile and Personal Communications, Conference Publications No. 387. (1993).

* cited by examiner

Primary Examiner—Serna S. Rao
Assistant Examiner—Kevin C. Harper
(74) Attorney, Agent, or Firm—Philip R. Wadsworth; Kent D. Baker; S. Hossain Beladi

(57) ABSTRACT

A method and apparatus for controlling a data rate associated with the transmission of information from a base station to a mobile station in a mobile radio communication system. The mobile station alternately receives information from a base station either in a variable rate mode or a fixed rate mode. The transmission rate from a base station in the variable rate mode varies between successive data transmit intervals, and the transmission rate from a base station in the fixed rate mode remains fixed between successive data transmit intervals. Data is transmitted from a first base station to the mobile station in the variable rate mode until the first base station is unable to receive variable data rate control information from the mobile station.

3 Claims, 4 Drawing Sheets

METHOD AND APPARATUS FOR VARIABLE AND FIXED FORWARD LINK RATE CONTROL IN A MOBILE RADIO COMMUNICATION SYSTEM

CROSS REFERENCE

This is a continuation application of application Ser. No. 09/231,743, filed Jan. 15, 1999, entitled "Method and Apparatus for Variable and Fixed Forward Link Rate Control in a Mobile Radio Communication System", now U.S. Pat. No. 6,205,129.

BACKGROUND OF THE INVENTION

I. Field of the Invention

The present invention relates generally to mobile radio communication systems. More particularly, the present invention relates to code division multiple access (CDMA) mobile radio communication systems that control the transmission rate of data information signals sent on the forward link from a base station to a mobile unit. Even more particularly, the present invention relates to a novel and improved system and method for controlling the transmission rate of data on the forward link by alternatively using variable and fixed rate data transmission modes to transmit data from a selected base station to the mobile station.

II. Description of the Related Art

In mobile radio communication systems, there are significant differences between the requirements for providing voice and data services (i.e., non-voice services such as internet or fax transmissions). Unlike data services, voice services require stringent and fixed delays between speech frames. Typically, the overall one-way delay of speech frames used for transmitting voice information must be less than 100 msec. By contrast, transmission delays that occur during data (i.e., non-voice information) services can vary and larger delays then those that can be tolerated for voice services can be utilized.

Another significant difference between voice and data services is that, in contrast to data services, voice services require a fixed and common grade of service. Typically, for digital systems providing voice services, this requirement is met by using a fixed and equal transmission rate for all users and a maximum tolerable error rate for speech frames. For data services, the grade of service can vary from user to user.

Yet another difference between voice services and data services is that voice services require a reliable communication link which, in the case of a CDMA communication system, is provided using a soft handoff. A soft handoff requires the redundant transmission of the same voice information from two or more base stations to improve reliability. This additional reliability is not required to support data services, because data packets received in error can be retransmitted.

As a mobile station moves in a mobile radio communication system, the quality of the forward link (and the capacity of the forward link to transmit data) will vary. Thus, at some moments a given forward link between a base station and a mobile station will be able to support a very high data transmission and, at other moments, the same forward link may only be able to support a much reduced data transmission rate. In order to maximize the throughput of information on the forward link, it would be desirable if the transmission of data on the forward link could be varied so as to increase the data rate during those intervals where the forward link can support a higher transmission rate.

When non-voice traffic is being sent from a base station to a mobile station on a forward link, it may be necessary to send control information from the mobile station to the base station. At times, however, even though the forward link signal may be strong, the reverse link signal may be weak, thereby resulting in a situation where the base station cannot receive control information from the mobile station. In such situations, where the forward link and the reverse link are unbalanced, it may be undesirable to increase the transmit power on the reverse link in order to improve the reception quality of the control information at the base station. For example, in CDMA systems, increasing the transmit power on the reverse link would be undesirable, as such a power increase could adversely affect the reverse link capacity seen by other mobile stations in the system. It would be desirable to have a data transmission system where the forward and reverse links associated with each mobile station were maintained in a balanced state without adversely impacting the reverse link capacity. It would be further desirable if such a system could maximize the throughput of non-voice data on individual forward links when such links are sufficiently strong to support higher data rates.

SUMMARY OF THE INVENTION

The present invention is directed to a method and apparatus for controlling a data rate associated with the transmission of information from a base station to a mobile station in a mobile radio communication system. The mobile station alternately receives information from a base station either in a variable rate mode or a fixed rate mode. The transmission rate from a base station in the variable rate mode varies between successive data transmit intervals, and the transmission rate from a base station in the fixed rate mode remains fixed between successive data transmit intervals. In order to maximize throughput on the forward link, the base station preferably uses the variable rate transmission mode to increase the data transmission rate whenever the forward link can support higher rates. The base station monitors control information sent from the mobile station on the reverse link, and the base station uses this control information to indicate to the mobile station when the reverse link is weak and in an unbalanced state with respect to the forward link. When the forward link is operating in the preferred variable rate mode and the mobile station determines that the reverse link is in an unbalanced state, the mobile station first attempts to locate a second base station that can operate in the variable rate mode and support a high data rate to the mobile station. If the mobile station locates such a second base station, then data transmissions continue from the second base station in the variable rate mode; otherwise, data transmissions continue from the first base station or a different base station in the fixed rate mode. The mobile unit then attempts to return to the variable rate mode when there is a forward link that is sufficiently strong to support data transmissions in the variable rate mode.

In a particularly preferred embodiment, data is transmitted from a first base station to the mobile station in the variable rate mode until the first base station is unable to receive variable data rate control information from the mobile station. The variable rate control information includes, for example, the data rate that the base station should use for transmitting data to the mobile station during the next transmit interval. When the first base station is unable to receive the variable data rate control information from the mobile station (thereby indicating that the current forward and reverse links are unbalanced), the mobile station attempts to remain in the variable rate mode by searching for a second base station that will support high data transmissions to the mobile station in the variable rate mode. In order to be selected, the second base station must have a long term average forward link signal to noise ratio that is not significantly less than the long term average signal to noise ratio associated with the forward link from the first base station. If the mobile station is able to locate the second base station that will support high data transmissions to the mobile station in the variable rate mode, then the second base station transmits data to the mobile station in the variable rate mode and transmissions from the first base station to the mobile station in the variable rate mode terminate. If the mobile station is unable to locate the second base station that will support data transmissions to the mobile station in the variable rate mode, data is transmitted to the mobile station from a designated base station (i.e., either the first base station or a different base station) in the fixed rate mode.

The mobile station will switch from the fixed rate mode back to the variable rate mode either (i) when the designated base station used for transmitting data to the mobile station in the fixed rate mode can again reliably receive the variable rate control information and the forward link signal received at the mobile station from the designated base station has a long term average signal to noise ratio that exceeds a threshold, or (ii) when the mobile station receives a signal from a further base station (other than the designated base station used for transmitting data to the mobile station in the fixed rate mode) with a long term average signal to noise ratio that exceeds by a threshold the long term signal to noise ratio needed on the forward link signal to support data transmissions in the fixed rate mode.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
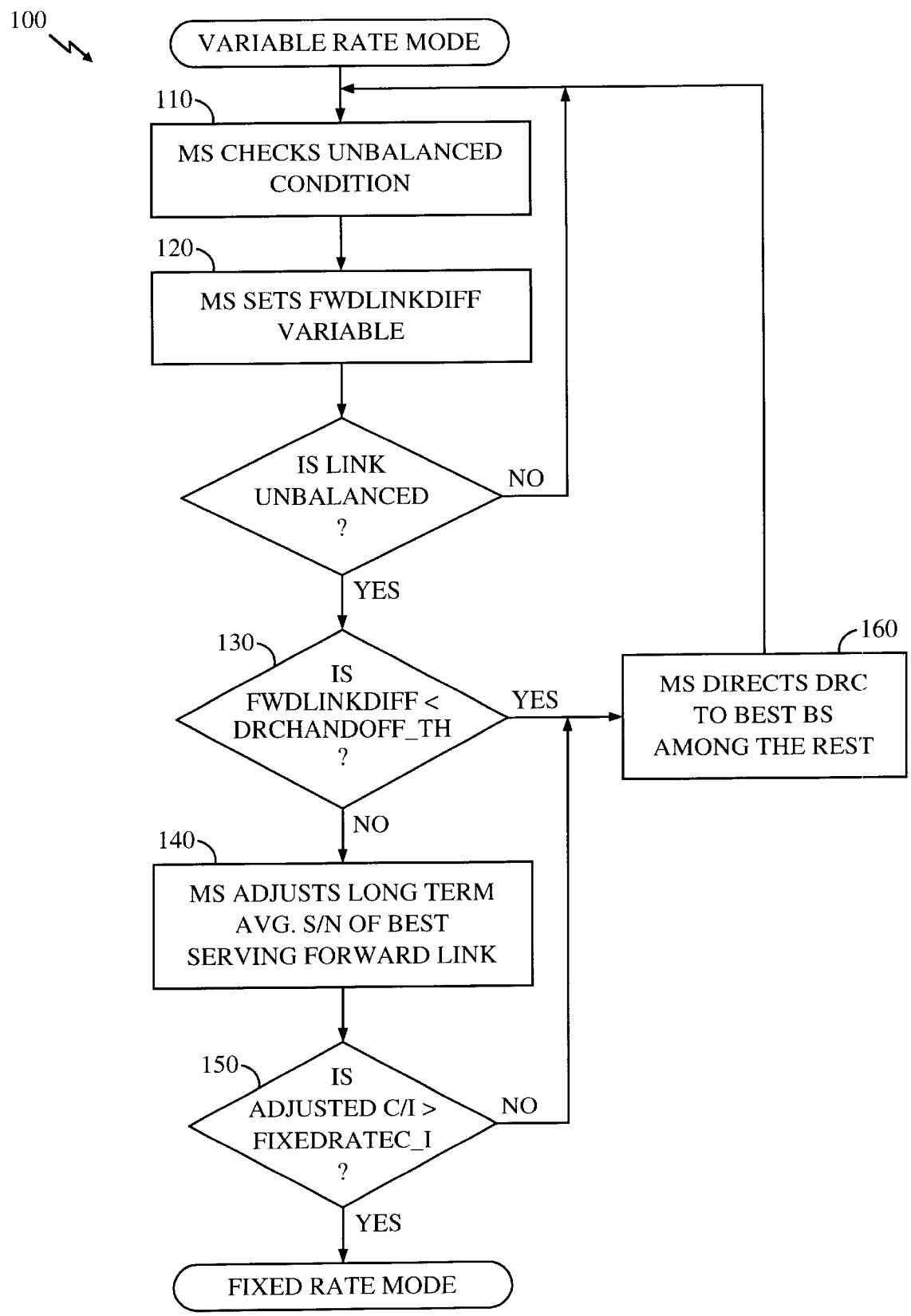
FIG. 1 depicts the operation of a system for controlling the transmission rate of information from a base station to a mobile station using a variable rate transmission mode, in accordance with a preferred embodiment of the present invention.

In the preferred embodiment of the present, a plurality of base stations send pilot signals to a mobile radio station. The base stations that have pilot signals that are strong enough to be reliably received at the mobile station are referred to as the active set of base stations. In the present invention, only one base station in the active set transmits data traffic (i.e., non-voice information such as internet traffic) to the mobile station on the forward link during a given time slot. In the preferred embodiment, CDMA modulation is used during such a time interval to transmit the data traffic from the single base station to the mobile station.

The present invention uses a variable rate data transmission mode to maximize the throughput of data traffic on the forward link. For purposes of the present invention, a base station is operating to send data to a mobile station in a variable rate transmission mode when the transmission rate of data traffic to the mobile station on the forward link is permitted to vary between successive time slots used for transmitting data from the base station to the mobile station. Thus, for example, if time slots T0, T5 and T10 were used to transmit data traffic from a base station to a mobile station in the variable rate transmission mode, the data traffic could be transmitted on the forward link at, for example, 153.6 Kbps during T0, 307.2 Kbps during T5, and again at 153.6 Kbps during T10. As explained more fully below in connection with FIG. 2, when a mobile station is not receiving data traffic from a base station in the variable rate mode, the mobile station may receive data traffic from a base station in a fixed rate mode. In contrast to the variable rate mode, a base station will be deemed to be operating to send data to a mobile station in a fixed rate transmission mode when the transmission rate of data traffic to the mobile station on the forward link is not permitted to vary (and is held fixed) between successive time slots used for transmitting data from the base station to the mobile station.

When operating in the variable rate mode, the mobile station continuously monitors the pilot signal from the base station that is transmitting data traffic to the mobile station. Based on the current and past values of the signal to noise ratio of the pilot signal sent from the base station, the mobile station predicts the maximum data rate that the forward link can support during the next transmit interval associated with the mobile station. The predicted maximum rate will thus vary as channel conditions vary. The mobile station then sends a quantized value representative of the predicted maximum data rate to the base station on a data rate control channel. If the base station is able to receive this data rate control message (DRC message) from the mobile station then, in the next time slot for transmitting data to the mobile station, the base station sends data traffic to the mobile station at the requested (i.e., predicted) rate. In addition, if the base station is able to reliably receive DRC messages from the mobile station on the data rate control channel, the base station sends a balanced state bit (i.e., the bit is set to 0 or 1) to the mobile station indicating that the base station is reliably receiving the DRC messages. The balanced state bit is sent to the mobile station on the forward link periodically and, in the preferred embodiment, the balanced state bit is sent to the mobile station on the forward link once every 400 msec. For every time slot, the mobile station predicts a new maximum data rate that the forward link can support during the next transmit interval and sends a quantized representation of this predicted value back to the base station as part of a DRC message. In response, the base station attempts to receive the DRC message from the mobile station and may send data traffic to the mobile station in the next time slot at the new requested rate. This process is then repeated after every time slot in the variable rate mode until, as described below, an unbalanced condition is detected in the system.

As mentioned above, when operating the variable rate mode, the mobile station predicts the maximum data rate that the forward link can support during the next transmit interval based on the current and past values of the signal to noise ratio of the pilot signal from the base station sending data to the mobile station. In one embodiment, the mobile station attempts to predict the maximum data rate that the forward link will be able to support 3 msec in the future. The 3 msec delay is used to account for, among other things, the transmit time required to send the maximum data rate information from the mobile station to a base station. In a particularly preferred embodiment, the mobile station predicts the maximum data rate for the next transmit interval by (1) calculating long term, medium term and short term average signal to noise ratios for the pilot signal from the base station transmitting data to the mobile station, (2) selecting from these three averages the one average with the smallest standard deviation, and (3) the n selecting a maximum data rate that can be supported given the selected average signal to noise ratio on the forward link. A quantized value representative of the selected maximum data rate is then sent to the base station as part of a DRC message on a data rate control channel. A preferred modulation system for sending DRC messages from a mobile station to a base station is disclosed in U.S. patent application Ser. No. 08/963,386, entitled "Method and Apparatus for High Rate Packet Data Transmission," which is assigned to the assignee of the present application, and the contents of which are hereby incorporated herein in their entirety by reference.

Referring now to FIG. 1, there is shown a flow diagram of a method 100 for controlling the transmission rate of information from a base station to a mobile station using a variable rate transmission mode, in accordance with a preferred embodiment of the present invention. When the system is operating in the variable rate mode as described above, the mobile station monitors the state of the balanced state bit periodically received from the base station. If the base station is unable to reliably receive DRC messages on the data rate control channel, then the base station will toggle the value of the next balanced state bit sent to the mobile station, thereby indicating to the mobile station that the system is in an unbalanced state such that the reverse link is unable to support transmission of the data rate information to the base station. In step 110, the mobile station will detect an unbalanced condition when operating in the variable rate mode if it receives two consecutive messages from the base station indicating that the base station is unable to receive DRC messages on the reverse link.

During operation in the variable rate mode, the mobile station continually monitors the pilot signals from all base stations in the active set (including the base station that is currently transmitting to the mobile station on the forward link) and maintains a "long term" average of the signal to noise ratio associated with each such base station. The long term average for each base station is determined by averaging samples of the signal to noise ratio associated with the base station over a period on the order of hundreds of milliseconds. The base station in the active set that is currently sending data to the mobile station is identified as the "best-serving" base station, and the base station in the active set (other than the best-serving base station) with the highest long term average signal to noise ratio is identified as the "second-best serving" base station. During operation in the variable rate mode (step 120), the mobile station maintains a value (FwdLinkDiff) which is the difference between the long term average signal to noise ratio associated with the best serving base station $(S/N)_{bestBB}$ and the long term average signal to noise ratio associated with the second-best serving base station $(S/N)_{2dbestBB}$ (i.e., FwdLinkDiff=$(S/N)_{bestBB}$−$(S/N)_{2dbestBB}$). In step 130, the mobile station compares the FwdLinkDiff value to a threshold (DRCHandoff_th) and, if the FwdLinkDiff is less then the threshold, then in step 160 the mobile station continues in the variable rate mode with the second-best serving base station (i.e., the mobile station predicts a new maximum data rate for transmissions from the second-best serving base station and sends a DRC message with this information to the second-best serving base station which attempts to receive the DRC message and send data traffic to the mobile station at the requested rate during the next transmit interval as described above).

If the FwdLinkDiff value is greater than the threshold (DRCHandoff_th) in step 130, this is an indication that the forward link associated with the second-best serving base station is significantly weaker than the forward link associated with the best-serving base station. The preferred embodiment of the present invention opts in certain cases not to switch the forward link from the best-serving base station to the second-best serving base station in the variable rate mode in cases where the forward link associated with the second-best serving base station is significantly weaker than the forward link associated with the best-serving base station, because the maximum data rate that can be achieved using the second-best serving base station is too low.

In steps 140 and 150, where the FwdLinkDiff value is greater than the threshold (DRCHandoff_th), the long term average signal to noise ratio associated with the best-serving base station is decremented by a fixed value (FixedRateCtoIDelta), and the adjusted long term signal to noise average associated with the best-serving base station is then compared to a further threshold (FixedRateC_I). The purpose of adjusting the long term average signal to noise ratio of the best-serving base station downward in step 140 is to compensate for slow fading which the mobile station may be experiencing in connection with transmissions from the best-serving base station, and the FixedRateC_I threshold represents the minimum value of the long term average signal to noise ratio of the best-serving base station (after adjustment in step 140) required to switch the system out of the variable rate mode and into the fixed rate mode.

If the long-term average signal to noise ratio of the best-serving base station (after adjustment in step 140) does not exceed the FixedRateC_I value, then in step 160 the mobile station continues in the variable rate mode with the second-best serving base station (i.e., the mobile station predicts a new maximum data rate for transmissions from the second-best serving base station and sends a DRC message containing this information to the second-best serving base station which attempts to receive the DRC message and send data traffic to the mobile station at the requested rate during the next transmit interval as described above). Remaining in the variable rate mode when the FixedRateC_I value is not exceeded in step 150 represents a design choice that, in cases where a minimum data rate cannot be achieved by switching to the fixed rate mode, it is preferable to remain in the variable rate mode and operate with a weak (i.e., low data rate) forward link.

If the long-term average signal to noise ratio of the best-serving base station (after adjustment in step 140) exceeds the FixedRateC_I value, then the mobile station uses the adjusted long term average signal to noise ratio of the best-serving base station to calculate a fixed data rate (the "requested fixed rate") that can be supported on the forward link associated with the best-serving base station in the fixed rate mode. The mobile station then attempts to enter the fixed rate mode as described in FIG. 2.

Figure 2:
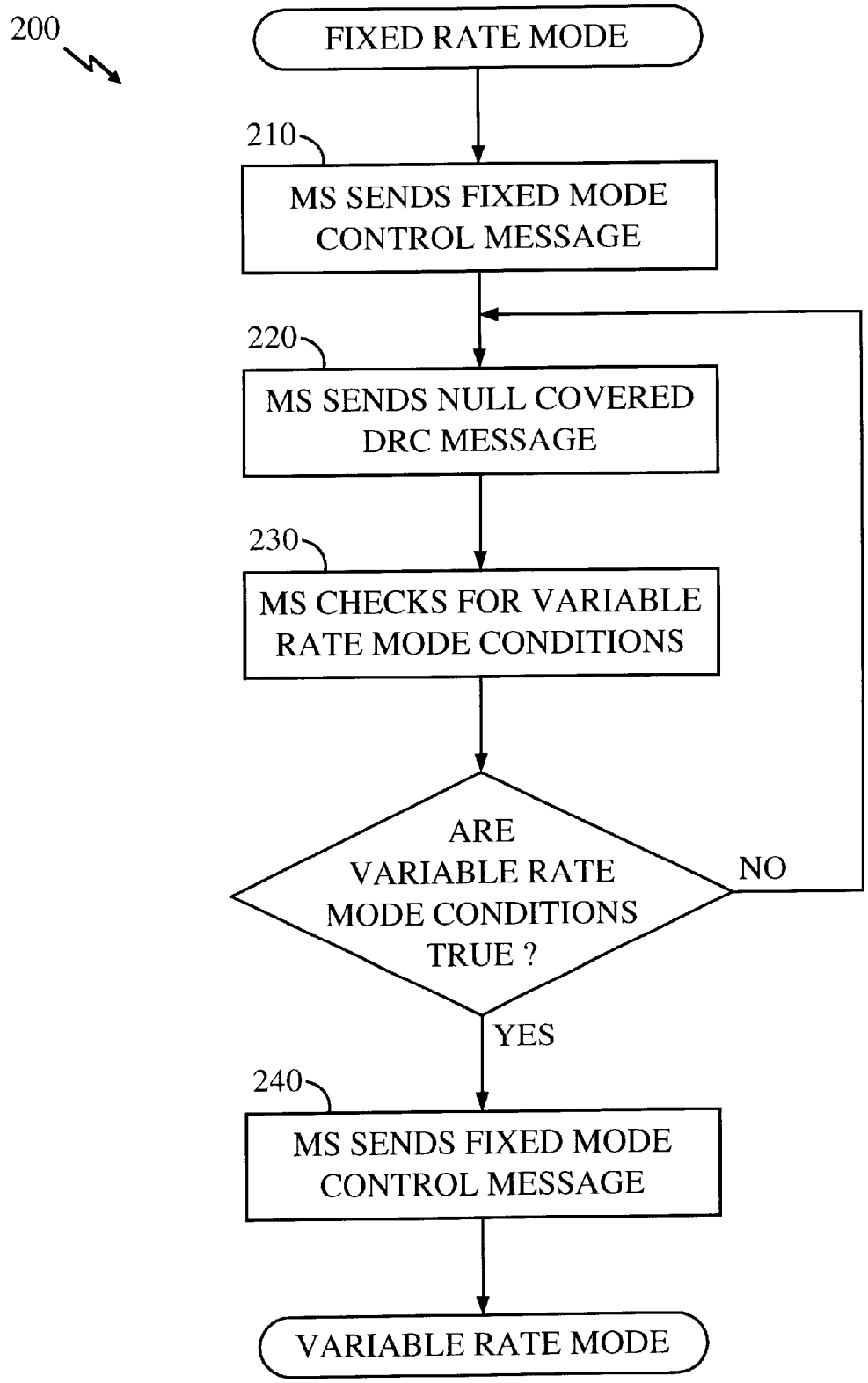
FIG. 2 depicts the operation of a system for controlling the transmission rate of information from a base station to a mobile station using a fixed rate transmission mode, in accordance with a preferred embodiment of the present invention.

Referring now to FIG. 2, there is shown a flow diagram of a method 200 for controlling the transmission rate of information from a base station to a mobile station using a fixed rate transmission mode, in accordance with a preferred embodiment of the present invention. In step 210, the mobile station attempts to be placed in the fixed rate mode by sending a FixedModeControl message to the base station controller (which is coupled by a digital link to the base stations in the system) with a FixedRateEnable bit set. This message includes the requested fixed rate at which the mobile station wants to receive data on the forward link and the identity of the base station from which the mobile station wants to receive data in the fixed rate mode. This message is sent using reliable delivery so that, if the base station identified in the FixedModeControl message cannot receive the message on the reverse link associated with that base station, another base station will receive the message from the mobile station and then route the message to the base station controller which will in turn send the message to the base station identified in the FixedModeControl message. After sending this message, the mobile station listens to the base station identified in the FixedModeControl message for any incoming data traffic at the requested fixed data rate. If the mobile station does not receive any valid frame of data traffic from the base station identified in the FixedMode-Control message before a fixed-mode counter expires, then the mobile station may either attempt again to enter the fixed rate mode by resending the FixedModeControl message as described above or return to the variable rate mode by using the second best serving base station to continue variable rate transmissions on the forward link. Alternatively, if the mobile station does not receive any valid frame of data traffic from the base station identified in the FixedMode-Control message before the fixed-mode counter expires, the mobile station may simply be placed in a failure state.

In step 220, after the FixedModeControl message is sent, the mobile station starts sending a DRC message using a null cover to the best-serving base station on a data control channel. The DRC message values are ignored in the fixed rate mode for data scheduling purposes but are used to determine if the conditions are right for leaving the fixed rate mode. While in the fixed rate mode, the base station specified in the FixedRateControl message continues sending data to the mobile station at the fixed rate specified in the FixedRateControl message as if the base station was continuing to receive a DRC message that included the requested fixed rate from that mobile station. In addition, while in the fixed rate mode, the mobile station monitors: (i) the balanced state bit from the base station sending the fixed rate data to the mobile station (this bit will be set based on whether or not the base station is able to successfully receive the DRC message as described above), and (ii) the long term average signal to noise ratios associated with all base stations in the active set. This information is used as described below to determine when the time is right for the mobile station to revert back to variable rate mode operation. In the preferred embodiment, once the mobile station enters the fixed rate mode, the mobile station is not permitted to vary the data rate or the base station used for transmitting data traffic to the mobile station.

In step 230, the mobile station tests to determine whether to exit the fixed rate mode and revert back to the variable rate mode. In the preferred embodiment, the mobile station will exit the fixed rate mode when one of the following two conditions are met: (1) the base station currently transmitting data traffic to the mobile station has a long term average signal to noise ratio that is above a threshold (VarRateThreshold dB) and the base station currently transmitting data traffic to the mobile station has set the balanced state bit to indicate that the base station is now reliably receiving DRC messages from the mobile station, or (2) another base station in the active set has a long term average signal to noise ratio at least VarRateThreshold dB above the signal to noise ratio needed to support the fixed rate at which the mobile station is currently receiving data traffic in the fixed rate mode. If either of these conditions is met, then in step 240 the mobile station attempts to exit the fixed rate mode by sending a FixedModeControl message to the base station controller with the FixedRateEnable field set to 0. If the mobile station receives an acknowledgment of this FixedModeControl message before a counter expires, the mobile station leaves the fixed rate mode by switching its DRC message to variable rate mode operation and thereafter, the mobile operates in accordance with method 100 in the variable rate mode as described above.

Figure 3:
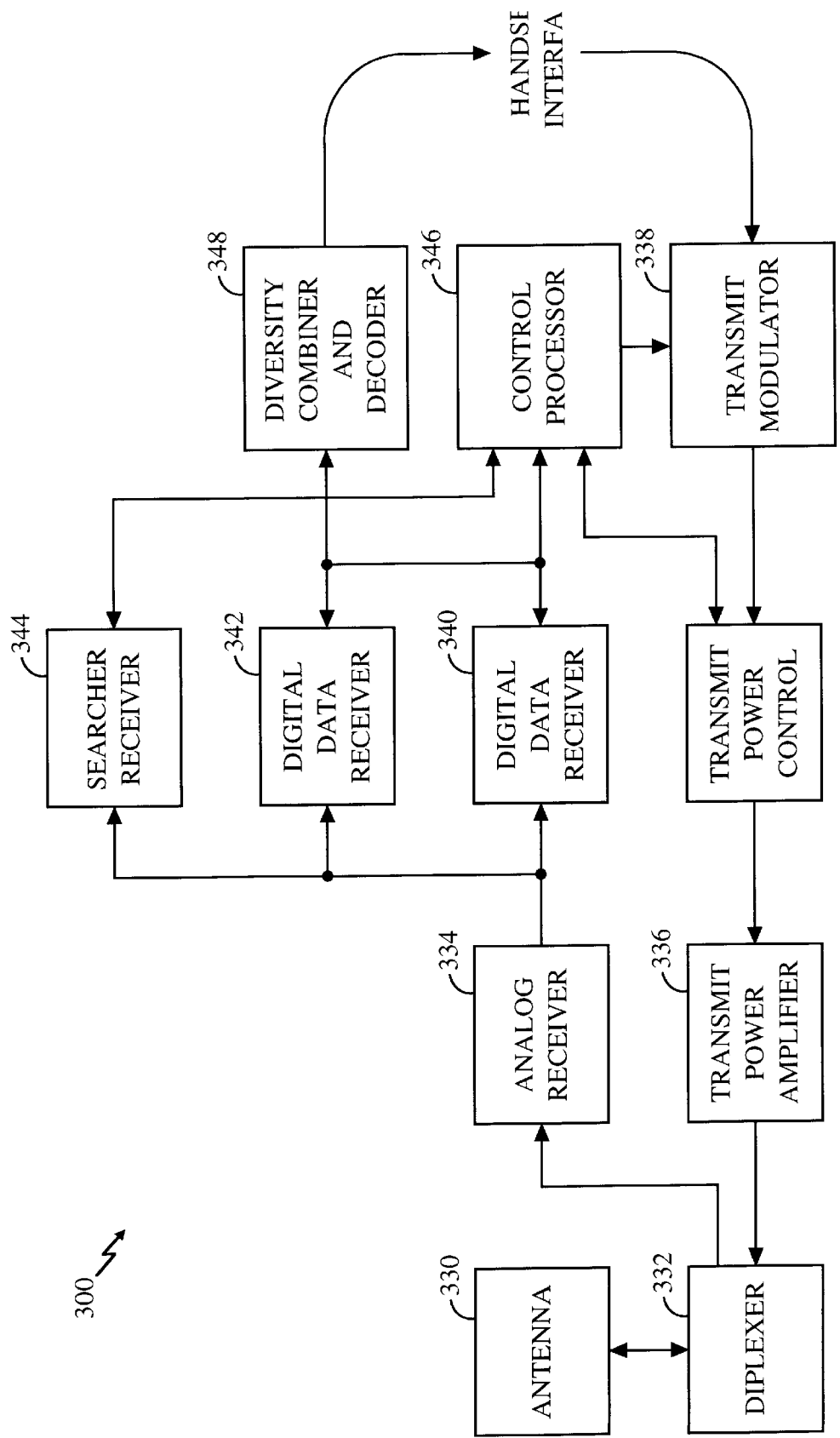
FIG. 3 is a block diagram of showing the components of an exemplary mobile station used for implementing the data transmission rate control system of the present invention.

Referring now to FIG. 3, there is a block diagram showing the components of an exemplary CDMA mobile station 300 used for implementing the data transmission mode and rate control systems of the present invention. The mobile station includes an antenna 330 which is coupled through diplexer 332 to analog receiver 334 and transmit power amplifier 336. Antenna 330 and diplexer 332 are of standard design and permit simultaneous reception and transmission through a single antenna. Antenna 330 collects signals transmitted to the mobile station from one or more base stations and provides the signals though diplexer 332 to analog receiver 334. Receiver 334 is also provided with an analog to digital converter (not shown). Receiver 334 receives RF signals from diplexer 332, amplifies and frequency downconverts the signals, and provides a digitized output signal to digital data receivers 340, 342 and to search receiver 344. It will be understood that, although in the embodiment in FIG. 3 only two digital data receivers are shown, a low performance mobile station might have only a single digital data receiver while higher performance units will have two or more digital data receivers to permit diversity reception. The outputs of receivers 340 and 342 are provided to diversity combiner circuitry 348 which time adjusts the two streams of data received from the receivers 340 and 342, adds the streams together and decodes the result. Details concerning the operation of the digital data receivers 340, 342, the search receiver 344, and the diversity combiner and decoder circuitry 348 are described in U.S. Pat. No. 5,101,501 entitled "Method and Apparatus for Providing A Soft Handoff In Communications In A CDMA Cellular Telephone System", which is assigned to the assignee of the present invention and incorporated herein by reference.

An output signal is provided from the decoder 348 to control processor 346. The output signal from the decoder will include, for example, any unbalanced state messages received at the mobile station, signal to noise ratio information for signals sent to the mobile station from the base stations in the active set, and acknowledgements of the FixedRateControl message when its FixedRateEnable field is set to 0. In response to this output signal, the control processor 346 determines the content of the DRC message to send to the appropriate base station or the content of the FixedModeControl message to send to the base station controller (if the mobile station is switching between the variable rate mode and the fixed rate mode). Systems 100 and 200 described above in connection with FIGS. 1 and 2 are preferably implemented in software on control processor 346. In response to these determinations, control processor 346 sends signals to the transmit modulator 338, which modulates control messages generated at the control processor 346 in accordance with spread spectrum modulation for transmission to the appropriate base station.

Figure 4:
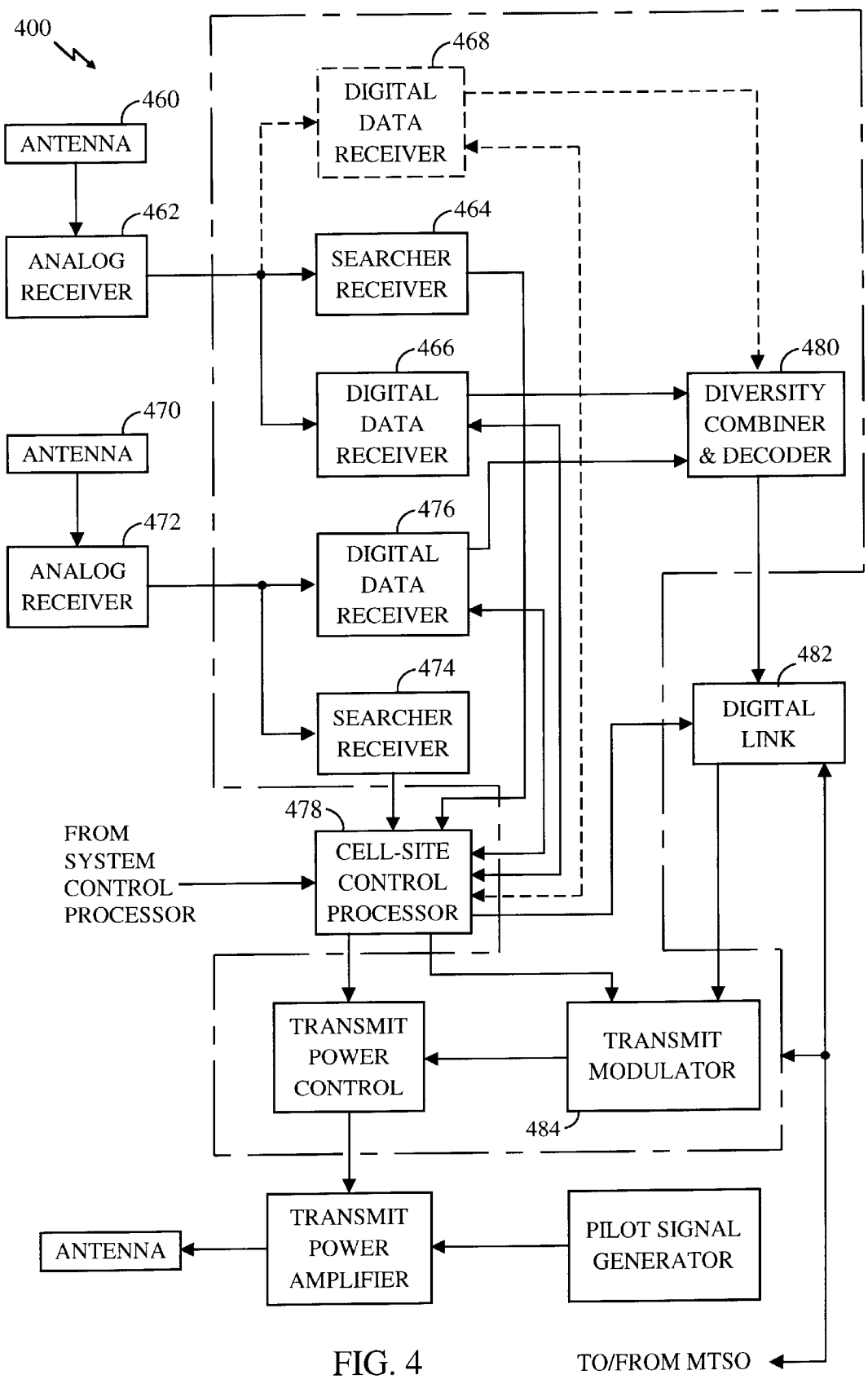
FIG. 4 is a block diagram of showing the components of an exemplary base station used for implementing the data transmission rate control system of the present invention.

Referring now to FIG. 4, there is shown a block diagram of the components of an exemplary CDMA base station 400 used for implementing the data transmission mode and rate control system of the present invention. At the base station, two receiver systems are utilized with each having a separate antenna and analog receiver for diversity reception. In each of the receiver systems, the signals are processed identically until the signals undergo a diversity combination process. The elements within the dashed lines correspond to elements corresponding to the communications between the base station and one mobile station. Referring still to FIG. 4, the first receiver system is comprised of antenna 460, analog receiver 462, searcher receiver 464 and digital data receivers 466 and 468. The second receiver system includes antenna 470, analog receiver 472, searcher receiver 474 and digital data receiver 476. Cell-site control processor 478 is used for signal processing and control. Among other things, cell site processor 478 monitors the variable and fixed rate control information (i.e., the DRC and FixedModeControl messages) received from a mobile and, in response to the successful receipt of such information, causes the base station to transmit data on the forward link at the specified rates. Cell site processor 478 also functions to cause the base station to send an unbalanced state message to the appropriate mobile station when the base station stops receiving variable rate control information from the mobile station.

Both receiver systems are coupled to diversity combiner and decoder circuitry 480. A digital link 482 is used to communicate signals from and to a base station controller or data router under the control of control processor 478. Signals received on antenna 460 are provided to analog receiver 462, where the signals are amplified, frequency translated and digitized in a process identical to that described in connection with the mobile station analog receiver. The output from the analog receiver 462 is provided to digital data receivers 466 and 468 and searcher receiver 464. The second receiver system (i.e., analog receiver 472, searcher receiver 474 and digital data receiver 476) process the received signals in a manner similar to the first receiver system. The outputs of the digital data receivers 466, 476 are provided to diversity combiner and decoder circuitry 480, which processes the signals in accordance with a decoding algorithm. Details concerning the operation of the first and second receiver systems and the diversity combiner and decoder 980 are described in U.S. Pat. No. 5,101,501 entitled "Method and Apparatus for Providing A Soft Handoff In Communications In A CDMA Cellular Telephone System", incorporated above. Signals for transmission to mobile units are provided to a transmit modulator 484 under the control of processor 478. Transmit modulator 484 modulates the data for transmission to the intended recipient mobile station.

The previous description of the preferred embodiments is provided to enable any person skilled in the art to make or use the present invention. Although the present invention has been described in conjunction with the transmission of data from a base station to a mobile station in a mobile radio communication system, the principles of the present invention may be applied in other contexts and applications. In addition, various modifications to the embodiments described above will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. A method for a communication system comprising:

controlling a data rate associated with transmission of information from a first base station to a mobile station;

receiving, by the mobile station, information from the first base station either in a variable rate mode or a fixed rate mode;

transmitting rate of information from the first base station to the mobile station in the variable rate mode varying between successive data transmit intervals associated with the mobile station;

transmitting data from the first base station to the mobile station in the variable rate mode until the first base station is unable to receive variable data rate control information from the mobile station;

attempting, when the first base station is unable to receive the variable data rate control information from the mobile station, at the mobile station to remain in the variable rate mode by searching for a second base station that will support data transmissions to the mobile station in the variable rate mode;

detecting an ability of the second base station to support data transmissions to the mobile station in the variable rate mode;

transmitting data from the second base station to the mobile station in the variable rate mode;

terminating the transmission of data from the first base station to the mobile station in the variable rate mode.

2. A method for a communication system comprising:

controlling a data rate associated with transmission of information from a first base station to a mobile station;

receiving, by the mobile station, information from the first base station either in a variable rate mode or a fixed rate mode;

transmitting rate of information from the first base station to the mobile station in the variable rate mode varying between successive data transmit intervals associated with the mobile station;

transmitting data from the first base station to the mobile station in the variable rate mode until the first base station is unable to receive variable data rate control information from the mobile station;

attempting, when the first base station is unable to receive the variable data rate control information from the mobile station, at the mobile station to remain in the variable rate mode by searching for a second base station that will support data transmissions to the mobile station in the variable rate mode;

detecting an inability of the second base station to support data transmissions to the mobile station in the variable rate mode;

transmitting data to the mobile station from either the first base station or a different base station in the fixed rate mode, wherein transmission rate of information in the fixed rate mode remaining fixed between successive data transmit intervals associated with the mobile station.

3. In a communication system, an apparatus comprising:

a transmitter at a first base station for transmitting data from to a mobile station in a variable rate mode;

a controller in the mobile station to maintain service in the variable rate mode by searching for a second base station that will support data transmissions to the mobile station in the variable rate mode when the first base station is unable to receive the variable data rate control information from the mobile station;

a transmitter at the second base station, responsive to signals from the mobile station, configured for transmitting data from the second base station to the mobile station in the variable rate mode if the mobile station is able to locate the second base station that will support data transmissions to the mobile station in the variable rate mode.

* * * * *